(12) United States Patent
Spatafora et al.

(10) Patent No.: US 6,990,783 B2
(45) Date of Patent: Jan. 31, 2006

(54) PRODUCT PACKING MACHINE

(75) Inventors: Mario Spatafora, Bologna (IT); Alver Tacchi, Bologna (IT)

(73) Assignee: G. D Societa' per Azioni, Bologna (IT)

( * ) Notice: Subject to any disclaimer, the term of this patent is extended or adjusted under 35 U.S.C. 154(b) by 0 days.

(21) Appl. No.: 10/838,865

(22) Filed: May 4, 2004

(65) Prior Publication Data

US 2005/0000188 A1 Jan. 6, 2005

(30) Foreign Application Priority Data

May 6, 2003 (IT) .......................... BO2003A0266

(51) Int. Cl.
*B65B 57/00* (2006.01)

(52) U.S. Cl. .............................. 53/54; 53/534; 53/148; 53/153

(58) Field of Classification Search ................... 53/54, 53/148, 152, 153, 531, 534, 535, 540, 542, 53/544, 247
See application file for complete search history.

(56) References Cited

U.S. PATENT DOCUMENTS

| | | | | | |
|---|---|---|---|---|---|
| 3,633,739 | A | * | 1/1972 | Renner et al. | 209/657 |
| 4,134,502 | A | * | 1/1979 | Seragnoli | 414/790.3 |
| 4,800,703 | A | * | 1/1989 | Goodman | 53/53 |
| 5,101,609 | A | * | 4/1992 | Cook | 53/53 |
| 5,406,770 | A | * | 4/1995 | Fikacek | 53/54 |
| 5,456,058 | A | * | 10/1995 | Ziegler | 53/447 |
| 5,666,789 | A | * | 9/1997 | Ziegler | 53/447 |
| 6,612,093 | B1 | * | 9/2003 | Grossmann et al. | 53/56 |
| 6,804,939 | B2 | * | 10/2004 | Samborn et al. | 53/493 |
| 2003/0031551 | A1 | * | 2/2003 | Williams | 414/790.6 |

\* cited by examiner

*Primary Examiner*—Scott A. Smith
*Assistant Examiner*—Brian Nash
(74) *Attorney, Agent, or Firm*—Ladas & Parry LLP

(57) ABSTRACT

A machine for packing products having a first packing unit for producing a succession of first packed groups of products and a second packing unit for grouping the first packed groups into second packed groups, each presenting a number of the first packed groups. A flat support serves for supporting the first packed groups and is interposed between the two packing units. A step-conveying device extends over the flat support and has a succession of pockets for receiving respective first packed groups, and provides an output portion whose pockets are detachable from the first packed groups to release the first packed groups on the flat support.

9 Claims, 3 Drawing Sheets

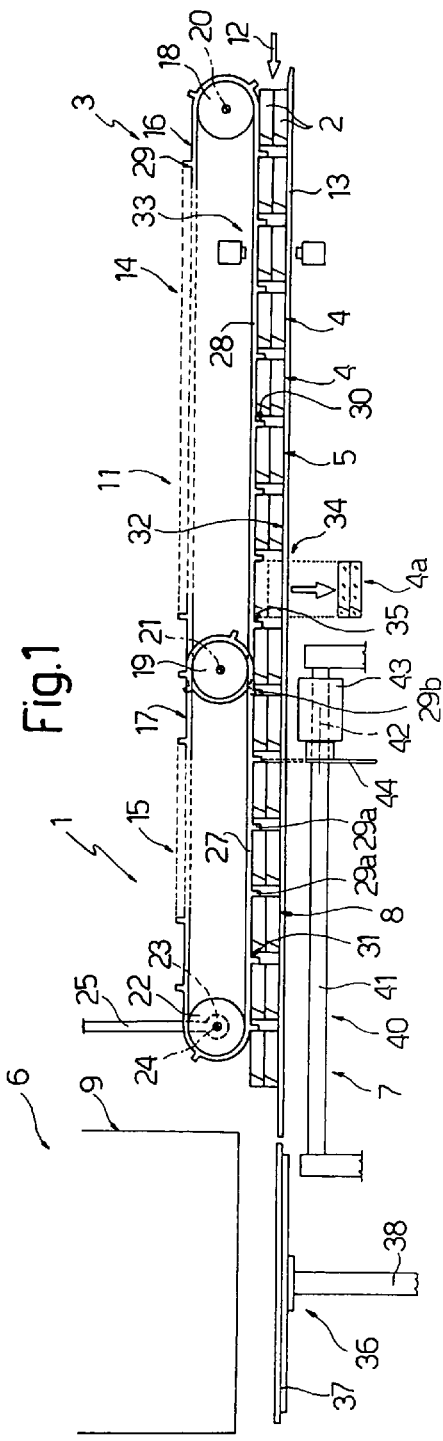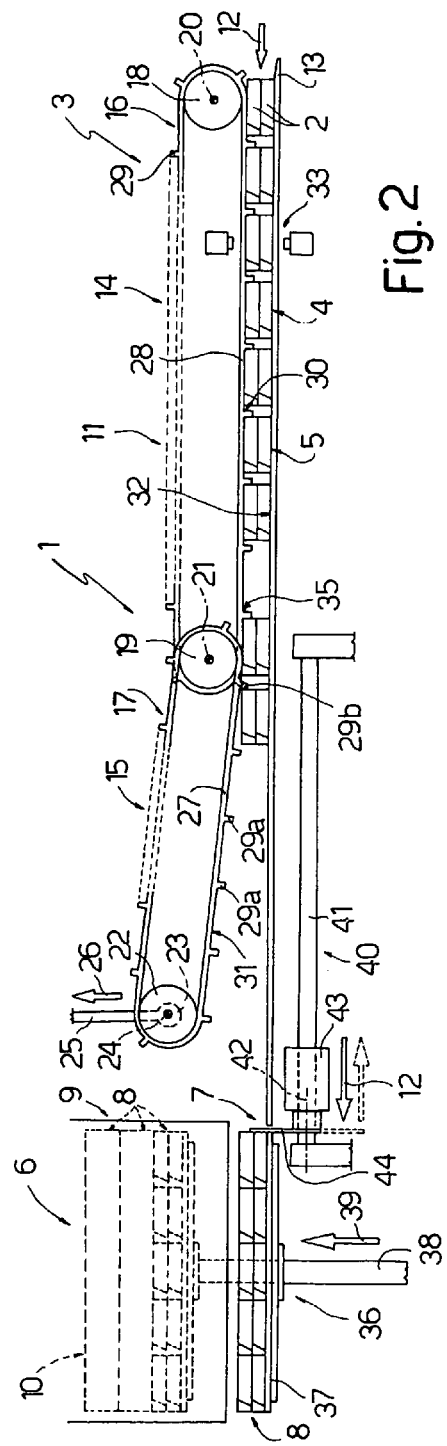

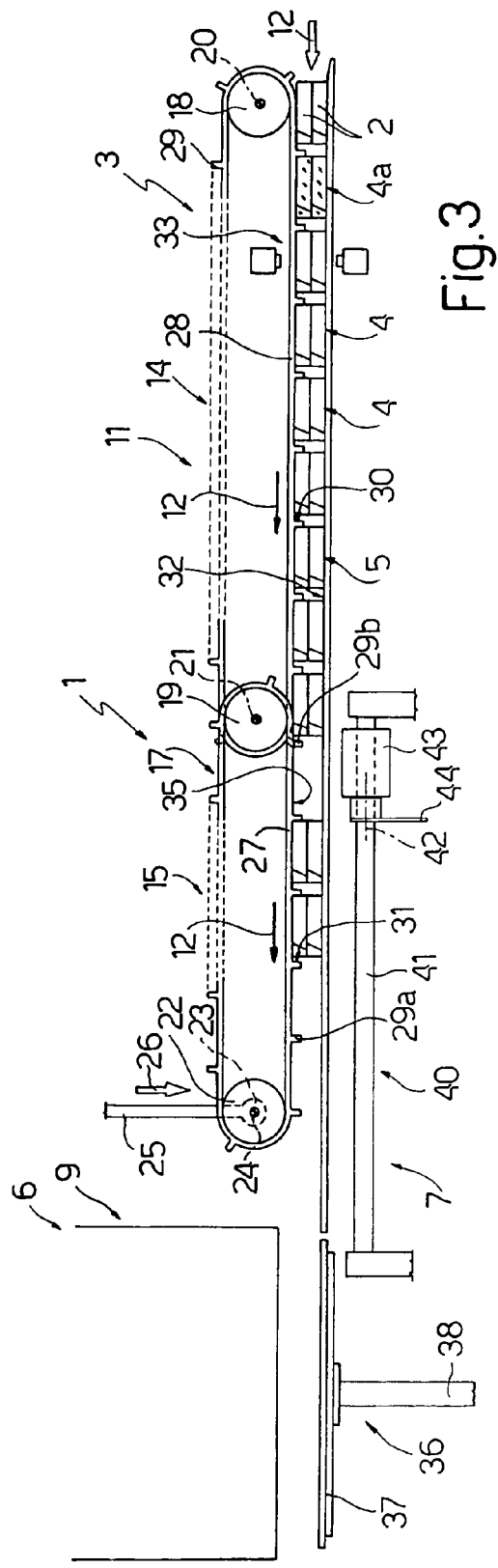
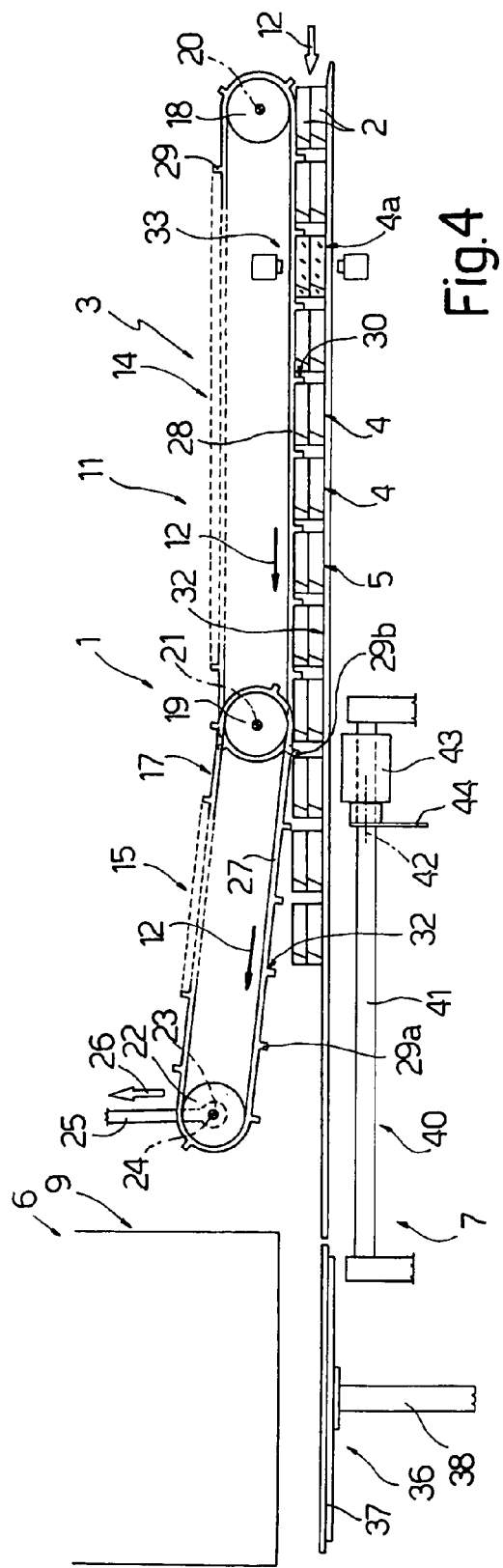

PRODUCT PACKING MACHINE

FIELD OF THE INVENTION

The present invention relates to a product packing machine.

Though suitable for packing any, in particular substantially parallelepiped-shaped, product, the present invention may be used to advantage in the tobacco industry for packing packets of cigarettes, to which the following description refers purely by way of example.

BACKGROUND OF THE INVENTION

In the tobacco industry, packing lines are normally used comprising a cartoning machine and a boxing machine, and along which packets of cigarettes are packed in two successive steps: a first step in which groups of normally ten packets are formed and enclosed inside a container to form so-called "cartons" on the cartoning machine; and a second step, in which the boxing machine forms a succession of groups of cartons, which are stacked to form a succession of multilayer groups, each of which is enclosed inside a respective box of cardboard or similar.

In packing machines of the above type, the cartoning and boxing machines are normally two separate machines, and the cartoning machine is connected to an input of the boxing machine by a carton group forming device, and by a pocket conveyor which feeds the cartons to the group forming device and extends through a carton quality control station and a carton reject station.

One of the drawbacks typical of known packing lines of the above type is that, when a carton is rejected at the reject station, a gap, i.e. an empty pocket, is formed along the conveyor connecting the cartoning machine to the boxing machine, and an incomplete group of cartons is formed, and subsequently rejected, on the group forming device on the boxing machine.

One solution employed to eliminate this drawback is to form, for example, along the connecting conveyor, a portion along which the cartons are pushed forward to fill any gaps. Alternatively, the cartons in the incomplete groups rejected by the boxing machine are fed back to the transfer conveyor immediately downstream from the reject station, and used to replace the rejected cartons.

Both the above known solutions involve using completely separate cartoning and boxing machines, a group forming device, and a relatively long, complex connecting conveyor.

SUMMARY OF THE INVENTION

It is an object of the present invention to provide a product packing machine, in particular for packing packets of cigarettes, designed to eliminate the aforementioned drawbacks.

According to the present invention, there is provided a product packing machine comprising a first packing unit for producing a succession of first packed groups of products; a second packing unit for grouping the first packed groups into second packed groups, each comprising a number of said first packed groups. A flat support supports said first packed groups and is interposed between said two packing units; and a conveying device extends over said flat support. The conveying device moves in steps, and has a succession of pockets for receiving respective first packed groups; said conveying device comprisings an output portion whose pockets are detachable from the first packed groups to release the first packed groups on the flat support. The said first packed groups are cartons of packets of cigarettes and said first and said second packing units are a cartoning unit and a boxing unit respectively.

BRIEF DESCRIPTION OF THE DRAWINGS

A non-limiting embodiment of the present invention will be described by way of example with reference to the accompanying drawings, in which:

FIG. 1 shows a schematic, partial side view, with parts removed for clarity, of a preferred embodiment of the machine according to the present invention;

FIGS. 2 to 5 show successive operating configurations of the FIG. 1 machine.

DETAILED DESCRIPTION OF THE INVENTION

Figure 5:
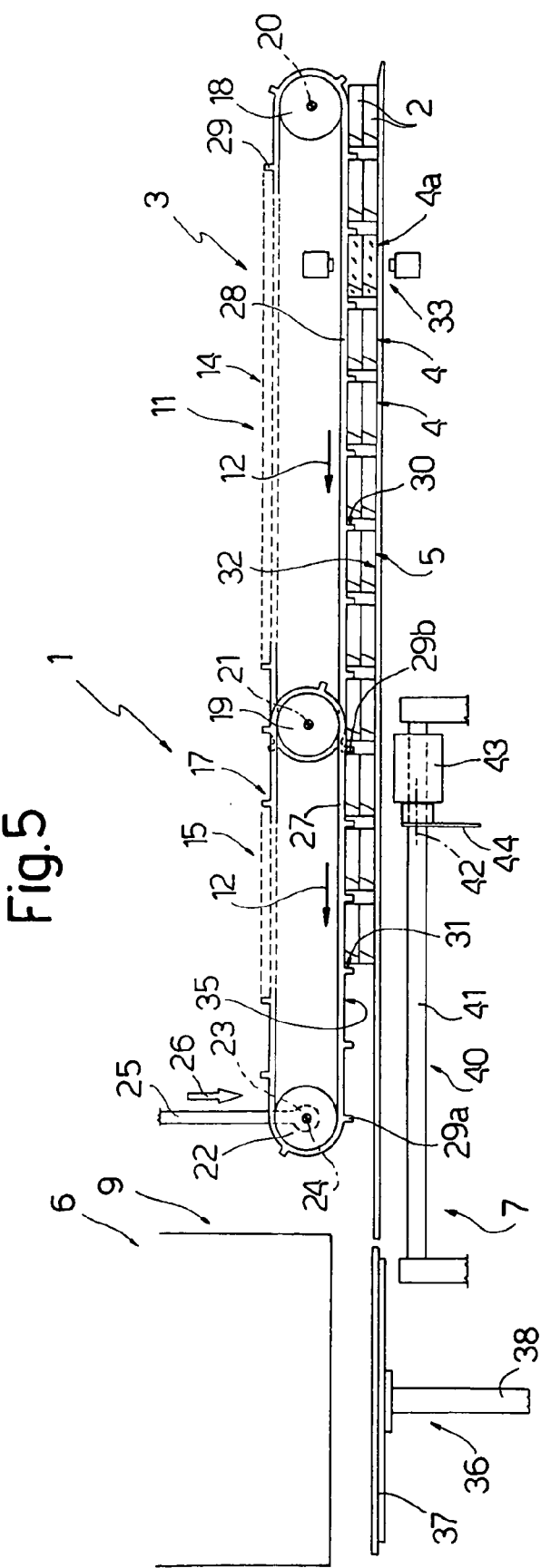

Number 1 in FIG. 1 indicates as a whole a machine for packing packets 2 of cigarettes, and which comprises a cartoning unit 3 for producing cartons 4, each comprising a relative group 5 of packets 2; and a known boxing unit 6 integrated in cartoning unit 3 and connected directly to cartoning unit 3 at a transfer station 7 where orderly groups 8 of cartons 4 from cartoning unit 3 are fed successively to a group-forming device 9 located at the input of boxing machine 6 and for forming groups 8 into further groups 10, each of which is packed inside a respective box (not shown) and comprises a number of layers, each defined by at least one respective group 8.

Cartoning unit 3 comprises an output conveying device 11 for receiving a succession of cartons 4 and feeding cartons 4 in steps, crosswise to their longitudinal axis and in a direction 12, to transfer station 7 located at an output end of conveying device 11.

Conveying device 11 comprises a flat support defined by a substantially horizontal base plate 13 for supporting said succession of cartons 4 in sliding manner; and two conveyors 14 and 15 arranged in series in direction 12 and over plate 13. Conveyor 14 is defined by two side by side belts 16 (only one shown) located a given distance apart and looped about two pulleys; and conveyor 15 is defined by a belt 17 also looped about two pulleys. More specifically, belts 16, located upstream from belt 17 in direction 12, are looped about two pulleys 18 and 19—of which pulley 19 is a drive pulley—mounted to rotate about respective fixed axes 20 and 21 parallel to plate 13 and perpendicular to direction 12; and belt 17 is looped about pulley 19 which is therefore common to both conveyors 14 and 15—between belts 16, and about a further pulley 22 fitted to a frame 23 and rotating, with respect to frame 23, about an axis 24 parallel to axes 20 and 21.

Whereas axes 20 and 21, as stated, are fixed, axis 24 is movable with frame 23, under the control of an actuator 25 and in a direction 26 substantially perpendicular to base plate 13, between a lowered position (FIGS. 1, 3, 5), in which a bottom conveying branch 27 of belt 17 is coplanar with a bottom conveying branch 28 of belts 16, and a raised position (FIGS. 2, 4), in which bottom conveying branch 27 is tilted upwards with respect to base plate 13 as of pulley 19.

Belts 16, 17 have respective successions of equally spaced teeth 29, 29a defining, along bottom branches 28, 27 and with base plate 13, respective successions of pockets 30, 31, each for receiving a respective carton 4. Teeth 29 and 29a are synchronized about pulley 19 so that each pocket 30 is synchronized with a corresponding pocket 31 beneath pulley 19; and teeth 29a are so numbered as to define, along bottom conveying branch 27 of belt 17, a number of pockets 31 at least equal to, but normally greater than, the number of cartons 4 in each group 8.

Bottom conveying branch 28 of belts 16 is separated from base plate 13 by a distance just slightly greater than the thickness of cartons 4 measured in direction 26, and defines, with base plate 13, a channel 32, which continues beneath bottom branch 27 of belt 17, and along which cartons 4 are fed, not by friction with belts 16 and 17, but solely by the positive thrust exerted by teeth 29 and 29a. When belt 17 is in the raised operating position, however, only the tooth—indicated 29b—on bottom branch 27 of belt 17 closest to pulley 19 is able to interfere with cartons 4.

A known control station 33 for controlling the quality of cartons 4, and a known reject station for rejecting faulty cartons 4, are located in series in direction 12 along the portion of channel 32 extending beneath belts 16. As shown in FIG. 2, when a carton 4 is expelled at reject station 34, a gap 35 corresponding to an empty pocket 30 is formed in the succession of cartons 4 travelling along channel 32.

Boxing unit 6 faces an output end of base plate 13 in direction 12, and comprises, beneath group-forming device 9, a lifting device 36 in turn comprising a plate 37, which is movable, under the control of an actuator 38 and in a substantially vertical direction 39 perpendicular to direction 12, between a lowered rest position, in which plate 37 is coplanar with and adjacent to base plate 13, and a raised work position, in which plate 37 is located inside group-forming device 9.

At transfer station 7, cartoning unit 3 comprises an accelerating device 40 located along base plate 13, downstream from pulley 19 in direction 12, and which comprises a fixed guide 41 having an axis 42 parallel to direction 12, and a powered slide 43 fitted to guide 41 to move along guide 41 between a withdrawn position, in which slide 43 is located beneath bottom conveying branch 27 of belt 17, and a forward position, in which slide 43 is located downstream from pulley 22 and at the output end of base plate 13. Slide 43 supports a push member 44 movable with slide 43 along axis 42, and which is powered to oscillate about axis 42 between a conveying position, in which push member 44 engages the portion of channel 32 beneath bottom conveying branch 27 of belt 17, and a return position, in which push member 44 is located outside channel 32.

Operation of machine 1 will now be described as of a normal operating condition (FIG. 1), in which cartons 4 are fed in steps by conveying device 11 along base plate 13 to form, downstream from push member 44 in the withdrawn position, and beneath bottom conveying branch 27 of belt 17 in the lowered position, a group 8 defined, in the example shown, by five cartons 4.

At this point, during a stop of conveying device 11, actuator 25 is operated to move frame 23 and pulley 22 into the raised position and detach teeth 29a of conveying branch 27 from cartons 4 in said group 8, and accelerating device 40 is operated to move push member 44 first about axis 42 into channel 32, and then along axis 42 in direction 12 to compact cartons 4 in group 8 and feed group 8 (FIG. 2) onto plate 37 of lifting device 36.

When actuator 38 is operated, group 8 is fed into group-forming device 9 to define, in known manner, at least part of a layer in a group 10 being formed. During the latter operation, push member 44 is moved about and along axis 42 back to its original position (FIG. 3), belt 17 is moved back into the lowered position, and conveying device 11 operates once more in steps to form another group 8 on base plate 13.

In the event a faulty carton 4—indicated 4a—has been detected beforehand at control station 33 and rejected at reject station 34, a gap 35 is formed along bottom conveying branch 28 of belts 16, and, on reaching belt 17 (FIG. 3), causes belt 17 to be raised (FIG. 4) to detach relative teeth 29a from all the cartons 4 beneath bottom conveying branch 27 of belt 17. The latter cartons 4 therefore remain stationary on base plate 13, while the following cartons 4 continue to be fed forward in steps by teeth 29 of belts 16 and by tooth 29b of bottom conveying branch 27 of belt 17, thus closing gap 35. In the example shown (FIG. 4), one idle step of belt 17 is sufficient to close the gap 35 (FIG. 3) formed by rejection of carton 4a.

Once gap 35 is filled, belt 17 can be moved back into the lowered position (FIG. 5) to form another complete group 8 on base plate 13.

In connection with the above, it should be pointed out that, by detaching teeth 29a from cartons 4 along channel 32 beneath bottom conveying branch 27 and downstream from push member 44 in the withdrawn position, not only are gaps 35 eliminated, but complete groups 8 are fed at all times by means of accelerating device 40 onto plate 37 of lifting device 36. This dual function of belt 17 provides for eliminating any reject device for rejecting incomplete groups 8 on boxing unit 6, for achieving a highly compact conveying device 11 capable of feeding cartons 4 directly from cartoning unit 3 to boxing unit 6, and for integrating both these units into a single packing machine such as machine 1 described.

Though teeth 29a are detached from relative cartons 4, in the example shown, by dividing conveying device 11 into two conveyors 14 and 15, and by rotating conveyor 15 upwards about axis 21 of pulley 19, the same result may obviously be achieved differently. For example, in an embodiment not shown, conveying device 11 is defined by one conveyor comprising an outer belt having, instead of conveying teeth, an equal number of transverse slots; and an inner belt having teeth which engage respective slots in the outer belt in sliding manner, and are movable, by local radial deformation of the inner belt with respect to the outer belt, between an extracted position conveying cartons 4, and a withdrawn position releasing cartons 4.

What is claimed is:

1. A machine for packing products (2), the machine (1) comprising a first packing unit (3) for producing a succession of first packed groups (4) of products (2); a second packing unit (6) for grouping the first packed groups (4) into second packed groups (10), each comprising a number of said first packed groups (4); a flat support (13) for supporting said first packed groups (4) and interposed between said two packing units 3, 6; and a conveying device (11) extending over said flat support (13); the conveying device (11) moving in steps, and comprising a succession of pockets (30, 31) for receiving respective first packed groups (4); said conveying device (11) comprising an output portion (17) whose pockets (31) are detachable from the first packed groups (4) to release the first packed groups (4) on the flat support (13), wherein said first packed groups (4) are cartons of packets (2) of cigarettes and said first and said second packing unit (3,6) are a cartoning unit and a boxing unit respectively.

2. A machine as claimed in claim 1, and comprising, for said first packed groups (4), a quality control station (33) and a reject station (34) located successively along said conveying device (11); said output portion (17) extending downstream from said reject station (34) in a travelling direction (12) of the conveying device (11).

3. A machine as claimed in claim 1, wherein said conveying device (11) is a step-operated conveying device.

4. A machine as claimed in claim 1, wherein said second packing unit (6) comprises an input (36) connected to said conveying device (11) and for receiving a succession of third groups (8), each of which is defined by a given number of coplanar, side by side said first packed groups (4); the pockets of said output portion (17) being at least equal in number to said given number.

5. A machine as claimed in claim 4, and also comprising a push member (44) movable back and forth along at least part of said output portion (17) and to and from said input (36) to feed a succession of said third groups (8) to said input (36).

6. A machine as claimed in claim 1, wherein said conveying device (11) comprises first and second conveyors (14, 15) located in series along said flat support (13) in a travelling direction (12) of the conveying device (11); said first and said second conveyor (14, 15) having respective pockets (30, 31) for conveying respective said first packed groups (4) along said flat support (13), and being linked to and in time with each other; said second conveyor (15) defining said output portion (17); and an actuator (25) to move said second conveyor (15) away from said flat support (13) and to detach the relative said pockets (31) from the respective said first packed groups (4).

7. A machine as claimed in claim 6, wherein said first and said second conveyors (14, 15) are belt conveyors having a common pulley (19) mounted to rotate about a fixed axis (21) of rotation crosswise to said travelling direction (12) and parallel to said flat support (13); said second conveyor (15) comprising a further pulley (22) downstream from said common pulley (19) in said travelling direction (12); and said further pulley (22) being connected to said actuator (25) to move transversely between a lowered position in which said second conveyor (15) engages the relative first packed groups (4), and a raised position in which said second conveyor (15) releases the relative first packed groups (4).

8. A machine for packing products (2), the machine (1) comprising
a first packing unit (3) for producing a succession of first packed groups (4) of products (2);
a second packing unit (6) for grouping the first packed groups (4) into second packed groups (10), each comprising a number of said first packed groups (4);
a flat support (13) for supporting said first packed groups (4) and interposed between said first and second packing units (3,6) and
a conveying device (11) extending over said flat support (13), moving in steps, comprising a succession of pockets (30, 31) for receiving respective first packed groups (4), and comprising an output portion (17) whose pockets (31) are detachable from the first packed groups (4) to release the first packed groups (4) on the flat support (13);
said conveying device (11) further comprising a first and a second conveyor 5 (14,15) located in series along said flat support (13) in a travelling direction (12) of the conveying device (11); said first and said second conveyor 5 (14, 15) having respective said pockets (30, 31) for conveying respective said first packed groups (4) along said flat support (13), and being linked to and in time with each other; said second conveyor (15) defining said output portion (17); and an actuator (25) to move said second conveyor (15) away from said flat support (13) and to detach the relative said pockets( 31) thereof from the respective said first packed groups (4).

9. A machine as claimed in claim 8, wherein said first and said second conveyor 5 (14, 15) are belt conveyors having a common pulley (19) mounted to rotate about a fixed axis (21) of rotation crosswise to said travelling direction (12) and parallel to said flat support (13); said second conveyor (15) comprising a further pulley (22) downstream from said common pulley (19) in said travelling direction (12); and said further pulley (22) being connected to said actuator (25) to move transversely between a lowered position in which said second conveyor (15) engages the relative first packed groups (4), and a raised position in which said second conveyor (15) releases said relative first packed groups (4).

* * * * *